United States Patent
Ji

(10) Patent No.: US 10,255,908 B2
(45) Date of Patent: Apr. 9, 2019

(54) SYSTEM FOR GRASPING KEYWORD EXTRACTION BASED SPEECH CONTENT ON RECORDED VOICE DATA, INDEXING METHOD USING THE SYSTEM, AND METHOD FOR GRASPING SPEECH CONTENT

(71) Applicant: SYSTRAN INTERNATIONAL CO., LTD., Seoul (KR)

(72) Inventor: Chang Jin Ji, Seoul (KR)

(73) Assignee: SYSTRAN INTERNATIONAL CO., LTD., Seoul (KR)

( * ) Notice: Subject to any disclaimer, the term of this patent is extended or adjusted under 35 U.S.C. 154(b) by 216 days.

(21) Appl. No.: 15/033,959

(22) PCT Filed: Sep. 18, 2014

(86) PCT No.: PCT/KR2014/008706
§ 371 (c)(1),
(2) Date: May 3, 2016

(87) PCT Pub. No.: WO2015/068947
PCT Pub. Date: May 14, 2015

(65) Prior Publication Data
US 2016/0284345 A1   Sep. 29, 2016

(30) Foreign Application Priority Data

Nov. 6, 2013  (KR) .................. 10-2013-0134246

(51) Int. Cl.
*G10L 15/00*    (2013.01)
*G10L 15/26*    (2006.01)
(Continued)

(52) U.S. Cl.
CPC ........ *G10L 15/12* (2013.01); *G06F 17/30631* (2013.01); *G10L 15/01* (2013.01);
(Continued)

(58) Field of Classification Search
CPC ......... G10L 15/08; G10L 15/26; G10L 25/54; G10L 15/05; G10L 2015/088; G06F 17/30755
See application file for complete search history.

(56) References Cited

U.S. PATENT DOCUMENTS 6,990,448 B2 * 1/2006 Charlesworth ... G06F 17/30038
704/243
7,324,939 B1 * 1/2008 Cardillo ............ G06F 17/30681
704/231
(Continued)

FOREIGN PATENT DOCUMENTS

JP  04-115298     4/1992
JP  2000-259628   9/2000
(Continued)

*Primary Examiner* — Olujimi A Adesanya
(74) *Attorney, Agent, or Firm* — Lex IP Meister, PLLC

(57) ABSTRACT

Disclosed are a system for grasping keyword extraction based speech content on recorded voice data, an indexing method using the system, and a method for grasping speech content. An indexing unit receives voice data, performs per-frame voice recognition with reference to a phoneme to form a phoneme lattice, generates divided indexing information for a frame of a limited time configured with a plurality of frames, and stores the same in an indexing database, the divided indexing information including a phoneme lattice formed for each frame of the limited time. A searcher uses a keyword input by a user as a search word, performs a comparison on the divided indexing information stored in the indexing database with reference to a phoneme, searches a phoneme string matching the search word, and finds a voice portion corresponding to a search word through a precise acoustic analysis regarding the matching phoneme string, and the grasper grasps a representative word through a search result searched by the searcher and outputs it to the user so as to grasp speech content of the voice data.

17 Claims, 12 Drawing Sheets

(51) Int. Cl.
*G10L 15/06* (2013.01)
*G10L 15/12* (2006.01)
*G10L 15/08* (2006.01)
*G06F 17/30* (2006.01)
*G10L 15/01* (2013.01)
*G10L 15/187* (2013.01)
*G10L 15/02* (2006.01)

(52) U.S. Cl.
CPC ............ *G10L 15/08* (2013.01); *G10L 15/187* (2013.01); *G10L 2015/025* (2013.01); *G10L 2015/088* (2013.01)

(56) References Cited

U.S. PATENT DOCUMENTS

| | | | | |
|---|---|---|---|---|
| 7,912,699 | B1* | 3/2011 | Saraclar | G10L 15/142 704/9 |
| 8,626,508 | B2* | 1/2014 | Katsurada | G10L 15/12 704/231 |
| 2005/0010412 | A1* | 1/2005 | Aronowitz | G10L 15/02 704/254 |
| 2006/0206324 | A1* | 9/2006 | Skilling | G06F 17/30746 704/231 |
| 2007/0143110 | A1* | 6/2007 | Acero | G10L 15/05 704/251 |
| 2007/0162481 | A1* | 7/2007 | Millett | G06F 17/30613 |
| 2009/0030680 | A1* | 1/2009 | Mamou | G06F 17/30746 704/235 |
| 2010/0324900 | A1* | 12/2010 | Faifkov | G10L 15/12 704/254 |
| 2011/0125499 | A1* | 5/2011 | Griggs | G10L 15/183 704/251 |
| 2011/0173226 | A1* | 7/2011 | Saraclar | G10L 15/142 707/769 |

FOREIGN PATENT DOCUMENTS

| | | |
|---|---|---|
| JP | 2000-284793 | 10/2000 |
| JP | 2001-092495 | 4/2001 |
| JP | 2006-031278 | 2/2006 |
| JP | 2007-271650 | 10/2007 |
| JP | 2010-267012 | 11/2010 |
| JP | 2011-070192 | 4/2011 |
| JP | 2011-185997 | 9/2011 |
| KR | 10-2009-0085673 | 8/2009 |
| KR | 10-2010-0120977 | 11/2010 |

* cited by examiner

| Search word | Context keyword | Representative word | |
|---|---|---|---|
| Search word 1 | Context keyword 1<br>Context keyword 2<br>⋮ | Representative word 1<br>Representative word 2<br>⋮ | |
| Search word 2 | Context keyword 3<br>Context keyword 4<br>Context keyword 5<br>⋮ | Representative word 3<br>Representative word 4<br>Representative word 5<br>⋮ | ─510 |
| ⋮ | ⋮ | ⋮ | |

# SYSTEM FOR GRASPING KEYWORD EXTRACTION BASED SPEECH CONTENT ON RECORDED VOICE DATA, INDEXING METHOD USING THE SYSTEM, AND METHOD FOR GRASPING SPEECH CONTENT

TECHNICAL FIELD

The present invention relates to a system for grasping keyword extraction based speech content on recorded voice data, an indexing method using the system, and a method for grasping speech content.

BACKGROUND ART

Recently, needs to search recording targets for recording a dialogue with a client for the purpose of a client satisfying service by a service provider, or recording a calling content, performing voice recognition thereon, and grasping whole speech contents from the recorded voice data for the purpose of electronic transactions have been on the rise.

However, no basic working programs or services for processing big data of the recorded voice of the client are developed, and it requires a huge amount of manpower or time for manually listening to the big data so such a search on the recording targets is not appropriately performed.

Further, there have been attempts to search a recording target based on a voice recognition technique, but such a voice recognition technique aims at an artificial intelligence voice recognition service for outputting a real-time input by a user as text through a voice recognition engine and extracting a meaning from the text output through an artificial intelligence based approaching method in a like manner of Siri by Apple or Assistant by Google. Therefore, when the recorded voice data are not accurately converted into text, the recording target may not be accurately searched so it becomes difficult to accurately grasp the recorded speech content.

DISCLOSURE

Technical Problem

The present invention has been made in an effort to provide a system for grasping speech content for storing indexed data on recorded voice data through phoneme-based voice recognition, grasping a keyword based speech content, and thereby accurately, easily, and quickly grasping the speech content, an indexing method using the system, and a method for grasping speech content.

Technical Solution

An exemplary embodiment of the present invention provides a system for grasping speech content, including: an indexing unit for receiving voice data, performing per-frame voice recognition with reference to a phoneme to form a phoneme lattice, and generating divided indexing information for a frame of a limited time configured with a plurality of frames, the divided indexing information including a phoneme lattice formed for each frame of the limited time; an indexing database for storing the divided indexing information generated by the indexing unit so as to be indexed by respective divided indexing information; a searcher for using a keyword input by a user as a search word, performing a comparison on the divided indexing information stored in the indexing database with reference to a phoneme, and searching a phoneme string matching the search word; and a grasper for grasping a representative word through a search result searched by the searcher and outputting it to the user so as to grasp speech content of the voice data.

The indexing unit includes: a featuring vector extractor for extracting a featuring vector from per-frame voice data; a phoneme recognizer for performing phoneme recognition with reference to frame synchronization by use of the featuring vector extracted by the featuring vector extractor, and generating a phoneme string; a candidate group forming unit for receiving the phoneme string generated by the phoneme recognizer, and generating candidate groups of phoneme recognition with respect to time for each frame; a phoneme lattice forming unit for performing an operation in reverse order of time on the phoneme string candidate groups formed by the candidate group forming unit to select one phoneme string candidate group and form a corresponding phoneme lattice; and an indexing controller for controlling the featuring vector extractor, the phoneme recognizer, the candidate group forming unit, and the phoneme lattice forming unit to perform control so as to form a phoneme based lattice for each limited time for the entire voice data and for each frame within the limited time and to perform control so as to store the phoneme lattice formed in this manner in the indexing database as divided indexing information for each limited time and thereby allow the same to be indexed for each limited time.

The indexing controller includes: a voice detector for indicating whether a voice is detected from voice data; a time counter for counting a temporal position of a phoneme for performing phoneme recognition on the voice data; a time limiter for counting the time starting from a time when a corresponding voice section is detected by the time counter when the voice section is detected by the voice detector, and counting the limited time; and an operation controller for performing control for performing per-frame phoneme recognition on a valid voice section detected by the voice detector within a limited time counted by the time limiter, forming a phoneme lattice, and storing the same in the indexing database as divided indexing information.

The operation controller performs control so as to overlap a voice section of a specific time or a specific frame from among a previous voice section and perform phoneme recognition with a voice section corresponding to a new limited time starting from the corresponding frame when the limited time counted by the time limiter lapses regarding the valid voice section detected by the voice detector.

The searcher includes: a search result history database for storing a search result searched by the searcher, and when there is a search result after having processed the search word input by the user, transmitting the same to the grasper; a pronunciation string generator for generating a per-phoneme pronunciation string corresponding to the search word input by the user; a search word database for storing the search word and a plurality of context keywords corresponding to the search word; a dynamic time warping processor for searching a phoneme string matching divided indexing information stored in the indexing database by using a pronunciation string generated by the pronunciation string generator, and selecting a voice section of a first candidate; and a verifier for determining a matching state on the voice section of the first candidate selected by the dynamic time warping processor through an acoustic model to determine one voice section, storing the determined voice section and information relating to the voice section in the search result history database, and simultaneously outputting the same to the grasper.

The dynamic time warping processor determines whether the phoneme string of the divided indexing information matches the pronunciation string through the dynamic time warping algorithm, and in the case of determination through the dynamic time warping algorithm, it determines that they match each other when their time warping degree is equal to or greater than a threshold value.

Regarding the voice section that has become a candidate, the verifier allocates the voice section for each frame according to the phoneme string with state information of a phoneme model with reference to a tri-phone model for the phoneme string of the search word, finds an accumulated value of a ratio of an observation probability value on the tri-phone model and an observation probability value on a mono-phone model, normalizes the same to calculate a reliability value, and determines whether to output the same as a finally searched result for the voice section according to the normalized reliability value.

When the one voice section is determined, the verifier performs an additional search to find whether there is a phoneme string matching the pronunciation string of the context keyword extracted from the search database corresponding to the search word within a predetermined time range with respect to the one voice section.

Information relating to the voice section stored in the search result history database includes a file name including the one voice section, a starting position and an ending position of voice data, the search word, a normalized reliability value on a searched section, a matching context keyword, and a sex of a speaker.

The grasper includes: a representative word database for setting a representative word for each search word and context keyword corresponding to the search word; a representative word grasper for extracting a search word and a context keyword from among search result information output by the searcher, and searching a corresponding representative word through the representative word database; and an output unit for receiving the search result information and the representative word from the representative word grasper and displaying the same to the user.

The context keyword sets a plurality of words carrying a same meaning according to a category method.

The searcher generates a pronunciation string for a byname with the same meaning as the search word and simultaneously searches the same.

The phoneme recognizer performs a Viterbi algorithm and a token passing algorithm for each phoneme to generate a corresponding phoneme string.

The phoneme lattice forming unit forms information including a starting point and an ending point of a phoneme and a duration of the corresponding phoneme string.

The divided indexing information includes a number of frames, a number of phonemes, a featuring vector, observation probability values for respective states of phonemes, a time stamp, a phoneme string, and durations of respective phonemes.

Another embodiment of the present invention provides, in an indexing method for a speech content grasping system to perform voice recognition on voice data with reference to a phoneme and storing the same to be available for indexing, an indexing method including: receiving voice data; forming a phoneme lattice on phonemes of the input voice data according to per-frame phoneme recognition; and storing the formed phoneme lattice in an indexing database as divided indexing information for each predetermined limited time, wherein the forming of a phoneme lattice is controlled to be performed on a valid voice section by detection of voice in the voice data.

In the forming of a phoneme lattice, when the phoneme lattice is formed for each limited time, phoneme recognition on a next voice section is performed by overlapping a voice section of a specific time or a specific frame of the previous voice section to prevent a loss of information and form the phoneme lattice.

The forming of a phoneme lattice includes using a featuring vector extracted from per-frame voice data, performing an operation in reverse order of time on a plurality of phoneme string candidate groups generated by phoneme recognition with reference to frame synchronization, and forming a phoneme lattice corresponding to one finally selected voice section.

Yet another embodiment of the present invention provides, in a method for a speech content grasping system to grasp speech content of voice data, a method for grasping speech content including: receiving a search word from a user; generating a pronunciation string with reference to a phoneme corresponding to the search word; searching a phoneme string matching divided indexing information stored in an indexing database by use of the pronunciation string, and selecting a voice section of a first candidate, the indexing database storing the phoneme lattice formed by performing voice recognition on the voice data for each frame with reference to a phoneme as divided indexing information for a plurality of respective frames of a limited time; determining a matching state of the voice section of the first candidate through an acoustic model to determine one voice section; additionally searching whether there is a phoneme string matching a pronunciation string of a context keyword corresponding to the search word within a predetermined time range with reference to the one voice section; and grasping a representative word for the voice data through the search word and the context keyword, and providing the same to the user.

In the grasping of a representative word and providing the same to the user, the grasping of a representative word is performed through a representative word database in which representative words are set for respective search words and corresponding context keywords.

The search words are plural, a plurality of search words are used by a logical operator, and a search is performed by a combination of the plurality of search words.

Advantageous Effects

According to the present invention, the keyword input as a search word is extracted from the voice data with reference to a phoneme, so there is no need to grasp all words of the voice data used in the actual service to provide a fast searching speed and high accuracy, the performance is better than the case of applying a dictation program that uses a general large-capacity continuous speech voice recognition engine requiring consecutive reflection of unregistered words to a recording search regarding the actual recorded data, and it has excellent performance in maintenance and cost saving of the service system.

Further, the speech contents of the voice file may be grasped according to a search result by a combination of a plurality of search words and a search result of representative words so the time for grasping the speech content on the voice file is reduced, and the response to the clients may be resultantly processed in a shorter time.

MODE FOR INVENTION

Figure 1:
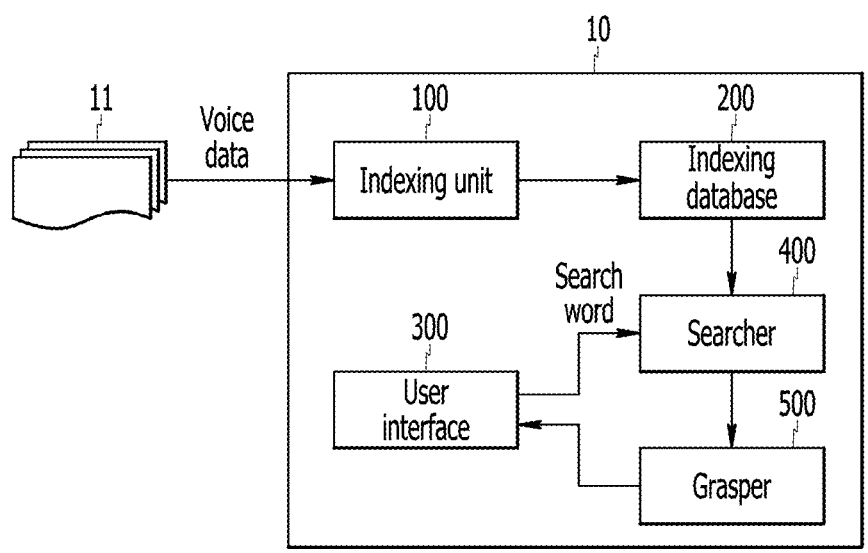
FIG. 1 shows a brief configuration of a system for grasping a speech content based on extraction of a keyword according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er," "-or," and "module" described in the specification mean units for processing at least one function and operation, and can be implemented by hardware components or software components and combinations thereof.

FIG. 1 shows a brief configuration of a system for grasping speech content based on extraction of a keyword according to an exemplary embodiment of the present invention.

As shown in FIG. 1, the system 10 for grasping speech content based on extraction of a keyword according to an exemplary embodiment of the present invention includes an indexing unit 100, an indexing database (DB) 200, a user interface 300, a searcher 400, and a grasper 500.

The indexing unit 100 receives voice data of a voice file 11 stored in a recording server (not shown), performs voice recognition with reference to a phoneme, and forms a phoneme lattice. Such the voice recognition with reference to a phoneme is performed for each voice section limited time to form a corresponding phoneme lattice, and regarding the voice data in the voice section limited time, phoneme recognition is performed for each frame to form a corresponding phoneme lattice. The phoneme lattice generated for each voice section limited time by the indexing unit 100 is stored in the indexing DB 200 as divided indexing information.

The indexing DB 200 stores the indexing information generated by the indexing unit 100. The indexing information represents divided indexing information including a phoneme lattice generated for each voice section limited time. The indexing information includes a number of frames, a number of phonemes, a featuring vector, observation probability values for respective states of phonemes, a time stamp, a phoneme string, and durations of respective phonemes. Here, the durations of respective phonemes represent durations in the voice file 11, and for example, they may be durations that are calculated through a starting position and an ending position of the voice file, and a starting position and an ending position.

Figure 2:
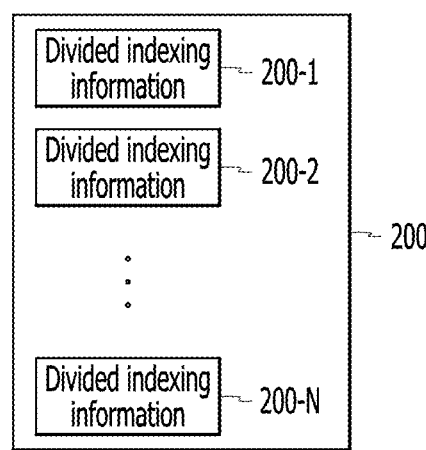
FIG. 2 shows an example of an indexing DB shown in FIG. 1.

FIG. 2 shows an example of an indexing DB 200 shown in FIG. 1.

As shown in FIG. 2, the indexing DB 200 stores N (N is a natural number that is equal to or greater than 1) numbered divided pieces of indexing information (200-1, 200-2, ..., 200-N) as a single file. For each file, information including a number of divided indexing portions, a version number of an indexing unit, a size of an original voice file, and a degree of a featuring vector is recorded in a header. Further, the divided indexing information includes header information including a number of frames and a number of phoneme strings, and actual indexed information. The actual indexing information recorded includes a featuring vector, a time stamp, a phoneme string, a phoneme string duration information, and an observation probability value on the phoneme string.

To continue, the user interface 300 is a device for an interaction with the user, and it may be realized by using a general user interface configuration. For example, the user interface 300 may include a keyboard and a mouse device for receiving an input from the user, a display device for providing a display on a screen to the user, and a microphone and a speaker for inputting and outputting sound.

The searcher 400 converts a search word which is a keyword input by the user through the user interface 300 into a phoneme, compares the divided indexing information (200-1, 200-2, ..., 200-N) stored in the indexing DB 200 with the phoneme, searches a phoneme string matching the search word, and generates a search result. Here, the searcher 400 may perform a search according to various methods, and in an exemplary embodiment of the present invention, it performs a search by use of a dynamic time warping (DTW) algorithm known as a representative of the recognition algorithm. The dynamic time warping algorithm is a method for determining similarity by comparing a representative pattern and a given input pattern, which is known to a person to a person skilled in the art, and a detailed description thereof will be omitted.

Further, the searcher 400 may perform a search by using at least two keywords. In this case, the searcher 400 may simultaneously compare a plurality of used keywords and the divided indexing information (200-1, 200-2, . . . , 200-N) stored in the indexing DB 200 to perform the search.

The grasper 500 uses the search result generated by the searcher 400 to grasp a speech content of the user corresponding to the voice data recorded in the voice file 11, and outputs the same to the user interface 300 together with the search result. Examples of such speech contents include content for determining whether a client places an order in the case of a home shopping record, content for determining whether a customer service representative is kind or provides a proper promotion on a specific item, content for determining whether he/she leaks specific words, and military security content.

Figure 3:
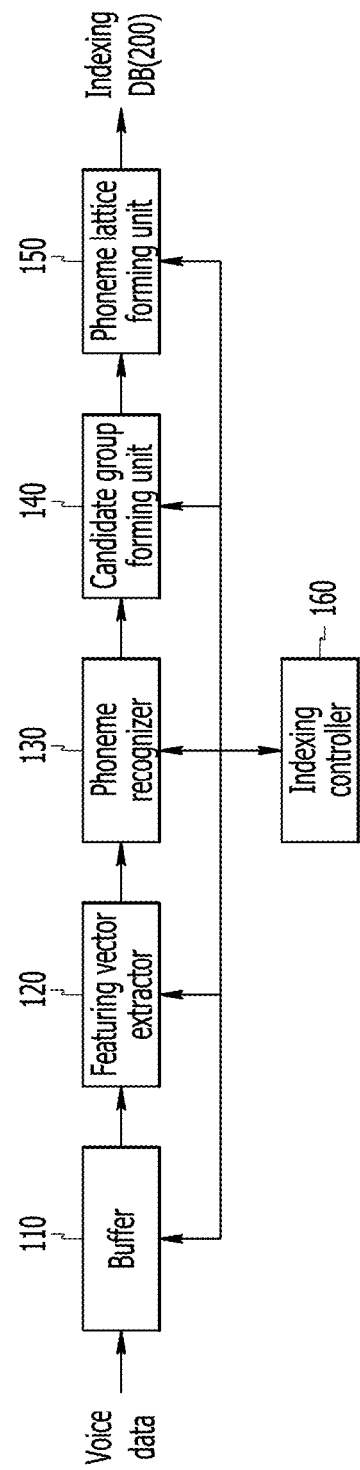
FIG. 3 shows a detailed configuration of an indexing unit shown in FIG. 1.

FIG. 3 shows a detailed configuration of an indexing unit 100 shown in FIG. 1.

As shown in FIG. 3, the indexing unit 100 includes a buffer unit 110, a featuring vector extractor 120, a phoneme recognizer 130, a candidate group forming unit 140, a phoneme lattice forming unit 150, and an indexing controller 160.

The buffer unit 110 includes a plurality of buffers (not shown) for receiving the voice data of the voice file 11 designated by the user through the user interface 300 and temporarily storing the same.

The featuring vector extractor 120 extracts a featuring vector from per-frame voice data stored and output by the buffer unit 110. The featuring vector extract is well known in the voice recognition field so no detailed description will be provided.

The phoneme recognizer 130 performs phoneme recognition with reference to frame synchronization by using the featuring vector extracted by the featuring vector extractor 120. The phoneme recognizer 130 performs a Viterbi algorithm and a token passing algorithm for each phoneme to generate a corresponding phoneme string. The Viterbi algorithm or the token passing algorithm is well known so no detailed description thereof will be provided.

The candidate group forming unit 140 receives the phoneme string generated by the phoneme recognizer 130 and generates candidate groups for phoneme recognition with respect to time for each frame, and the candidate groups are controlled to maintain at least N-numbered phoneme string candidate groups.

The phoneme lattice forming unit 150 performs an operation in reverse order of time on the N-numbered phoneme string candidate groups formed by the candidate group forming unit 140 to select one optimal phoneme string candidate group and form a corresponding phoneme lattice. In this instance, the phoneme lattice forming unit 150 forms information such as a starting point and an ending point of the phoneme on the corresponding phoneme string, and a duration. Here, the starting point and the ending point of the phoneme represent time information of the voice data at a point where the phoneme starts and time information of the voice data at a point where the phoneme ends. The phoneme lattice formed by the phoneme lattice forming unit 150 is included in the divided indexing information and is output to the indexing DB 200.

The indexing controller 160 controls the buffer unit 110, the featuring vector extractor 120, the phoneme recognizer 130, the candidate group forming unit 140, and the phoneme lattice forming unit 150 to perform control so as to form a phoneme based lattice for each limited time for the entire voice data and for each frame within the limited time and to perform control so as to store the phoneme based lattice formed in this manner, that is, the phoneme lattice in the indexing DB 200 as divided indexing information for each limited time and thereby allow the same to be indexed for each limited time. For example, when a voice section lasts for the limited time that is ten seconds, the indexing controller 160 forms a per-frame phoneme lattice corresponding to the limited time and stores the same in the indexing DB 200. When the voice section lasts over the limited time that is ten seconds, it detects a forcible voice ending point at the limited time that is ten seconds, and performs an operation for forming a phoneme lattice corresponding to divided indexing information of the next limited time by overlapping a voice section of the previous time for a specific time, for example, three seconds.

The indexing controller 160 will now be described in detail.

Figure 4:
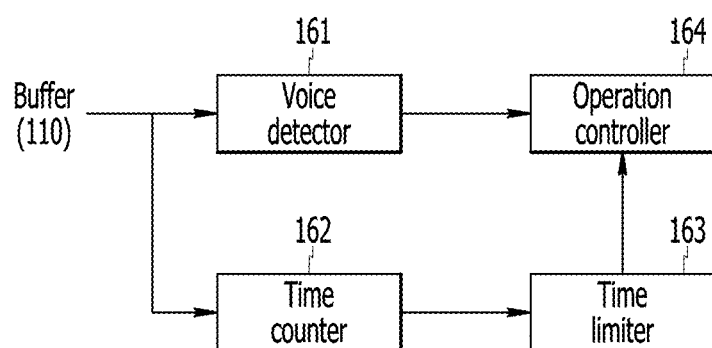
FIG. 4 shows a detailed configuration of an indexing controller show in FIG. 3.

FIG. 4 shows a detailed configuration of an indexing controller 160 show in FIG. 3.

As shown in FIG. 4, the indexing controller 160 includes a voice detector 161, a time counter 162, a time limiter 163, and an operation controller 164.

The voice detector 161 detects a valid voice section from the voice data stored in the buffer unit 110. That is, the voice detector 161 allows determining whether the detected voice data are in a present voice section. This is to perform an indexing on the valid voice section and store resultant information so as to reduce the size of indexing data since the voice does not always exist in the recorded file.

The time counter 162 counts a temporal position of the phoneme to which phoneme recognition is performed regarding the voice data stored in the buffer unit 110. The time counter 162 may start counting when the phoneme recognition by the operation controller 164 starts, and may output a time of the phoneme that is recognized at the present time.

When the voice section is detected by the voice detector 161, the time limiter 163 counts the time starting from a time when the corresponding voice section is detected by the time counter 162, and it counts a predetermined limited time such as ten seconds with reference to the above-noted example. When the time limiter 163 counts the total of ten seconds and the time lapses, it notifies the operation controller 164 of the same. In another way, it notifies whether the presently counted time passes the limited time according to a request by the operation controller 164.

The operation controller 164 performs per-frame phoneme recognition on the valid voice section detected by the voice detector 161 within the limited time counted by the time limiter 163, forms a phoneme lattice, and stores the same in the indexing DB 200 as divided indexing information. The operation controller 164 performs control so as to overlap a voice section of a specific time or a specific frame from among the previous voice section and perform phoneme recognition with a voice section corresponding to a new limited time starting from the corresponding frame when the limited time lapses by the time limiter 163 regarding the valid voice section detected by the voice detector 161.

The searcher 400 will now be described in detail.

Figure 5:
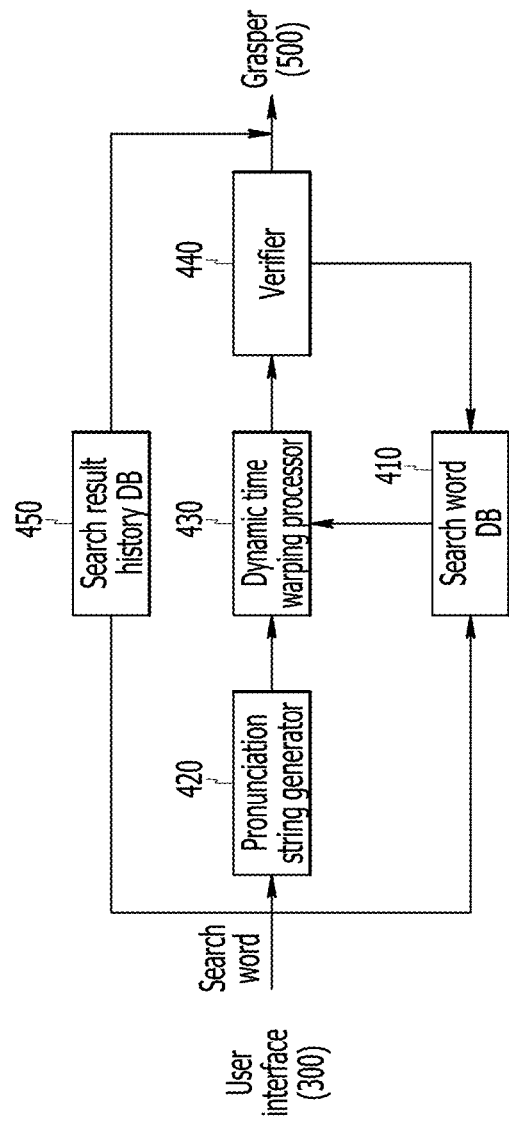
FIG. 5 shows a detailed configuration of a searcher shown in FIG. 1.

FIG. 5 shows a detailed configuration of a searcher 400 shown in FIG. 1.

As shown in FIG. 5, the searcher 400 includes a pronunciation string generator 420, a search DB 410, a dynamic time warping processor 430, a verifier 440, and a search result history DB 450.

The pronunciation string generator 420 receives a keyword, that is, a search word, from the user through the user interface 300, and generates a per-phoneme pronunciation string. In this instance, the search word represents a general spelling based word, but it may not always be spelling, and it may be written as pronounced since a pronunciation phenomenon may not be correctly reflected when a pronunciation string is generated. As an example of generating a pronunciation string, when the search word is "pineapple", the pronunciation string generator 420 may generate a pronunciation string such as "p a i n ae p l".

The search DB 410 stores a search word and a plurality of context keywords corresponding to the search word. Here, the context keyword represents a word that is a supplement to the corresponding search word, and when it is used with the search word, speech content of the voice data may be grasped. The context keyword is assumed to be preset by a user or a manager of the system for grasping speech content based on extraction of a keyword 10 according to an exemplary embodiment of the present invention. For example, when the search word is a "refrigerator" in the case of a recorded file on a dialogue at a customer service center of home appliances, the context keywords such as "kimchi", "wine", "trouble", or "repair" may be set for "refrigerator". In this instance, it is assumed that the per-phoneme pronunciation string corresponding to the context keyword stored in the search DB 410 is generated in advance together with a general spelling based word and they are stored.

The dynamic time warping processor 430 receives a search word and a pronunciation string generated corresponding to the search word from the pronunciation string generator 420, searches a phoneme string matching the divided indexing information stored in the indexing DB 200 by use of the corresponding pronunciation string, and outputs a phoneme section of a first candidate. Here, the matching state of the pronunciation string on the divided indexing information signifies that a time warping degree is greater than a threshold value according to a determined through the dynamic time warping algorithm.

The dynamic time warping algorithm performed by the dynamic time warping processor 430 will now be described in detail.

Figure 6:
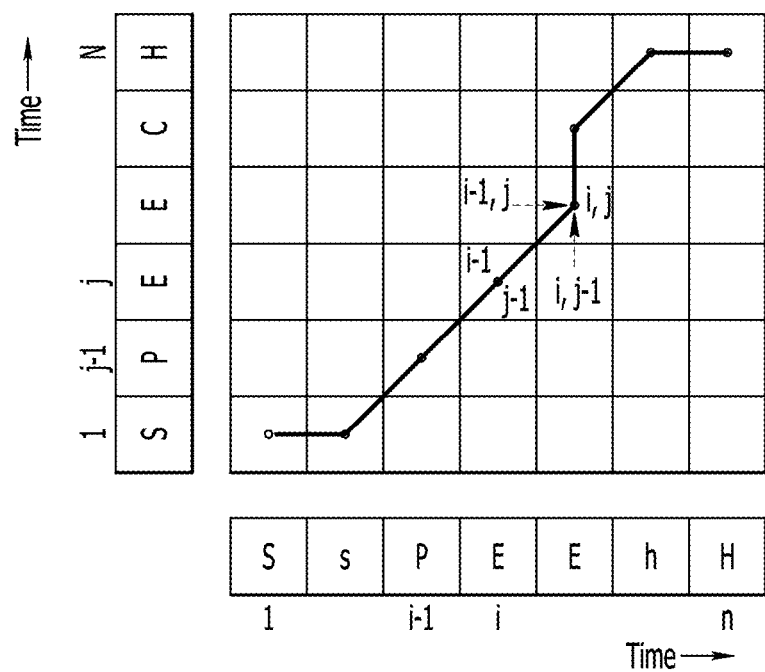
FIG. 6 shows a schematic diagram of a basic operation of a dynamic time warping algorithm performed by a dynamic time warping processor shown in FIG. 5.

FIG. 6 shows a schematic diagram of a basic operation of a dynamic time warping algorithm performed by a dynamic time warping processor 430 shown in FIG. 5.

Referring to FIG. 6, a horizontal axis represents part of a phoneme string of divided indexing information stored in the indexing DB 200, and a vertical axis represents a pronunciation string generated by converting a search word into a phoneme string. Here, the search word is "SPEECH" in English.

FIG. 6 shows a phoneme string matching "SPEECH", the search word, from among a plurality of phoneme strings.

Basically, the phoneme string determined by the phoneme lattice has accuracy that is about 60%. Therefore, a wrong phoneme may be inserted for each phoneme, it may not appear, or it may be recognized to be a different phoneme. Accordingly, a correct portion may appear in an earlier stage or later stage with respect to time. Therefore, in an exemplary embodiment of the present invention, as shown in FIG. 6, a route method that may be matched in an optimized way will be calculated through the dynamic time warping algorithm.

Figure 7:
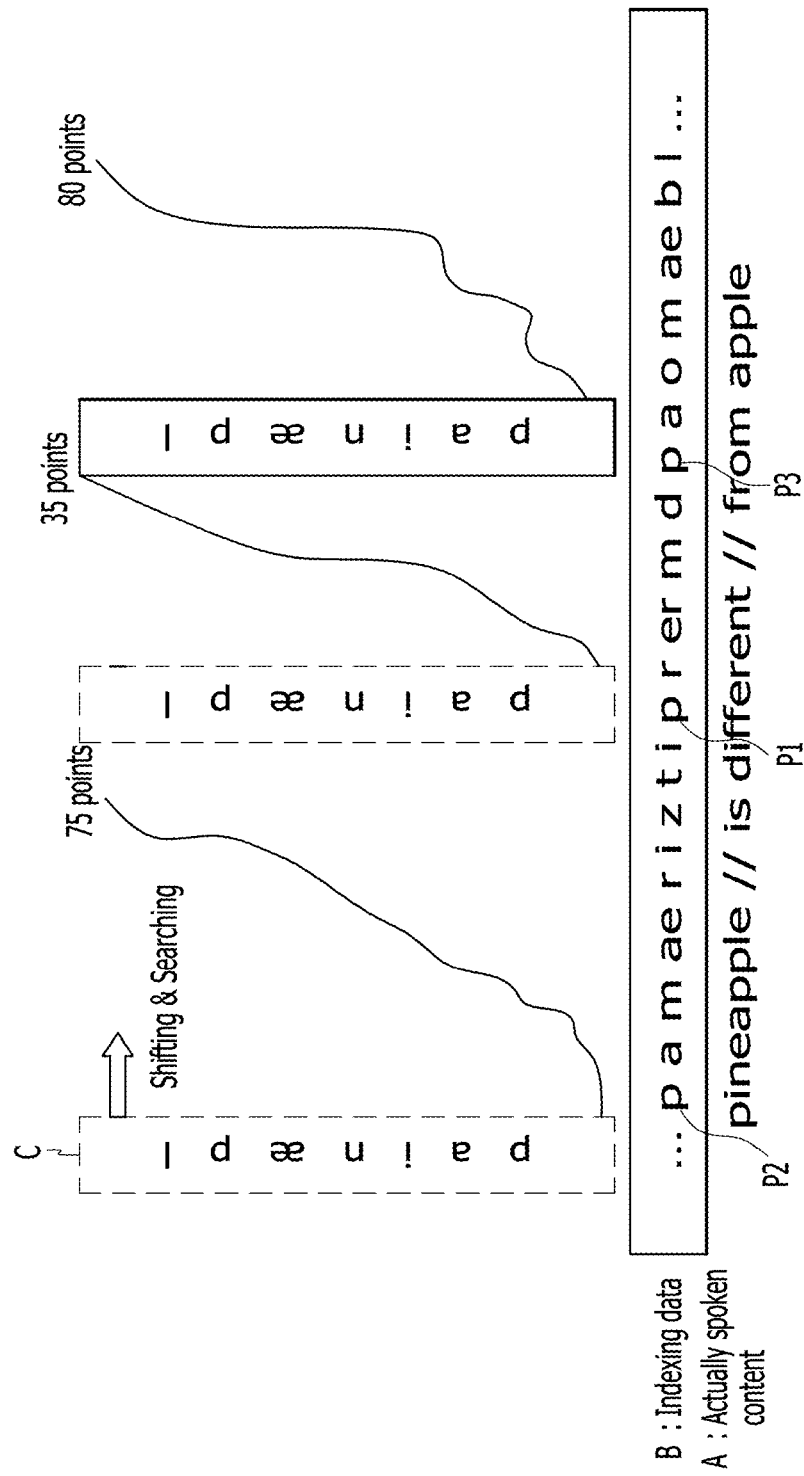
FIG. 7 shows an example of a dynamic time warping algorithm performed by a dynamic time warping processor shown in FIG. 5.

FIG. 7 shows an example of a dynamic time warping algorithm performed by a dynamic time warping processor 430 shown in FIG. 5.

Referring to FIG. 7, part of the actual spoken content (A) used in FIG. 7 from among the voice data is "pineapple is different from apple". Indexing data (B) used in FIG. 7 as a phoneme string stored in the indexing DB 200 by performing a phoneme based indexing on the voice data by the indexing unit 100 are "p a m ae r i z t i p r er m d p a o m ae b l". Since the search word is "pineapple", the pronunciation string (C) generated by the pronunciation string generator 420 is "p a i n ae p l" as described above.

Figure 8:
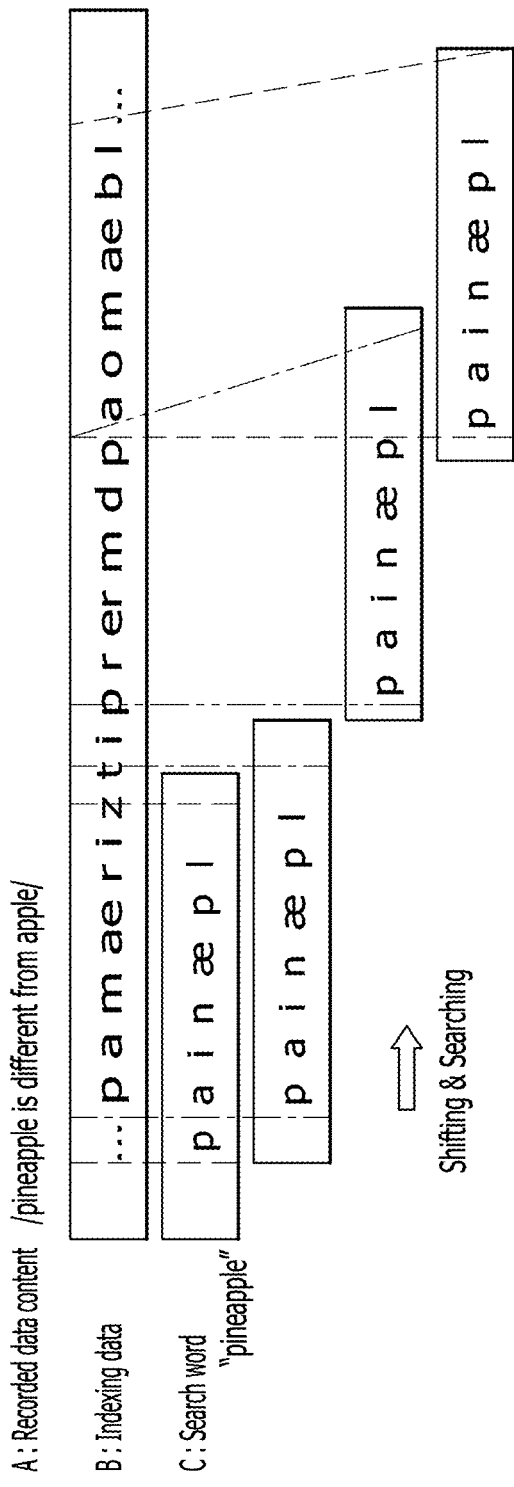
FIG. 8 shows a dynamic time warping process for a dynamic time warping processor shown in FIG. 5 to perform a search on indexing data (B) while shifting a search word (C) (i.e., shifting and searching).

Therefore, the dynamic time warping processor 430 performs the per-phoneme dynamic time warping algorithm shown in FIG. 6 on "p a m ae r i z t i p r er m d p a o m ae b l" that are indexing data (B) with reference to "p a i n ae p l" that is the pronunciation string (C) of the search word. Here, as shown in FIG. 8, the dynamic time warping processor 430 performs the dynamic time warping algorithm by searching the indexing data (B) while shifting the search word (C) (i.e., shifting & searching).

Referring again to FIG. 7, for example, a time warping degree is calculated by performing the dynamic time warping algorithm of the search word (C) and the indexing data (B) on a position of P1 from among the indexing data (B) as shown in FIG. 6, and for example, the time warping degree on the position of P1 becomes 35 points.

The time warping degree caused by performing the dynamic time warping algorithm of the search word (C) on the indexing data (B) at the position of P2 produces 75 points. Here, at the position of P2, "p" and "a" of the indexing data (B) match "p" and "a" of the search word (C), which is reflected to be a high score, "i" of the search word (C) is omitted to thus apply a penalty, "n" of the search word (C) is misrecognized as "m" of the indexing data (B), which is reflected to be a somewhat high score because their phonetic values are similar to each other, "p" of the search word (C) is omitted to thus apply a penalty, "l" of the search word (C) has a similar phonetic value to "r" of the indexing data (B) and thus has a somewhat high score, so as a whole, it has the high score of 75 through a matching of phoneme characters, and actually, it is greater than 60 points that is set to be a threshold value, and it is selected as the phoneme section of the first candidate.

In a like manner, the above-noted operation is performed on the indexing data (B) at the position of P3, so the time warping degree is calculated to be 80 points and is also selected to be the first candidate. Here, the speaking is substantially/from apple/, but it becomes "p a o m ae b l" because of inaccuracy of phoneme recognition, so "p a i n ae p l" and "p a o m ae b l" may have a high score in comparison of character strings. As described, the indexing data (B) that is somewhat different from the search word (C) becomes the first candidate, more accurate matching will be performed among the first candidates by a verifier 440 to be described, and the indexing data (B) at the position of P3 will be accordingly removed.

The verifier 440 determines one optimal voice section by precisely determining a matching state of the phoneme section of the first candidate selected by the dynamic time warping processor 430 according to an acoustic model, stores the determined voice section and various kinds of information relating to the voice section in the search result history DB 450, and simultaneously outputs the same to the grasper 500. Here, regarding the voice section that has become a candidate, the verifier 440 allocates the voice section for each frame according to the phoneme string with state information of a phoneme model with reference to a tri-phone model for the phoneme string of the search word, finds an accumulated value of a ratio of an observation probability value on the tri-phone model and an observation probability value on a mono-phone model, normalizes the same between a score of 0 and 100 to calculate a normalized reliability value, and determines the candidate with the highest normalized reliability value as the optimized candidate. The contents for using the acoustic model such as the tri-phone model or the mono-phone model are well known to a person skilled in the art so no detailed description thereof will be provided.

Further, when the optimized candidate is determined, the verifier 440 additionally searches whether there is a phoneme string matching the pronunciation string of the context keyword extracted from the search DB 410 corresponding to the search word within a predetermined time range with reference to the voice section corresponding to the optimized candidate. Here, it is desirable to set the predetermined time range to be within a range of a limited time, and within ten seconds according to the above-noted example.

Information output as a search result by the verifier 440 includes a file name including a searched phoneme string, a starting position and an ending position of voice data, a search word, a normalized reliability value on a searched section, a matching context keyword, and a sex of a speaker (male or female). Here, information on the sex of a speaker may be extracted by determining whether a male model or a female model has a greater similarity of voice signal in an acoustic manner.

The search result history DB 450 stores the search result output by the verifier 440 together with the search word, and when a search word is input through the user interface and a search performance history on the corresponding search word is found, it prevents repeated search performance and transmits the search result stored for the corresponding search word to the grasper 500.

The grasper 500 will now be described in detail.

Figures 9, 10:
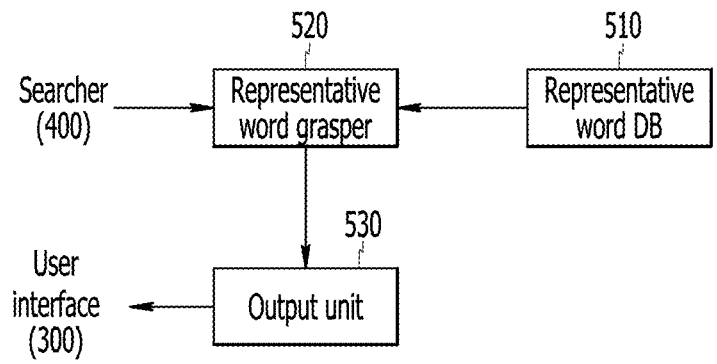
FIG. 9 shows a detailed configuration of a grasper shown in FIG. 1.
FIG. 10 shows an example of a representative word DB shown in FIG. 9.

FIG. 9 shows a detailed configuration of a grasper 500 shown in FIG. 1.

As shown in FIG. 9, the grasper 500 includes a representative word DB 510, a representative word grasper 520, and an output unit 530.

For example, as shown in FIG. 10, the representative word DB 510 sets a representative word corresponding for each search word and context keyword. That is, a plurality of context keywords are set to one search word, and respective representative words are preset to the plurality of context keywords.

The representative word grasper 520 extracts a search word and a context keyword from among search result information output by the searcher 400, searches a corresponding representative word through the representative word DB 510, and outputs a searched representative word. For example, when the search word is "refrigerator" and the matching context keywords are "kimchi" and "trouble", the representative word grasper 520 grasps "trouble in kimchi refrigerator" as the representative word. Therefore, the representative word given here may correspond to the speech content of voice data.

Figure 11:
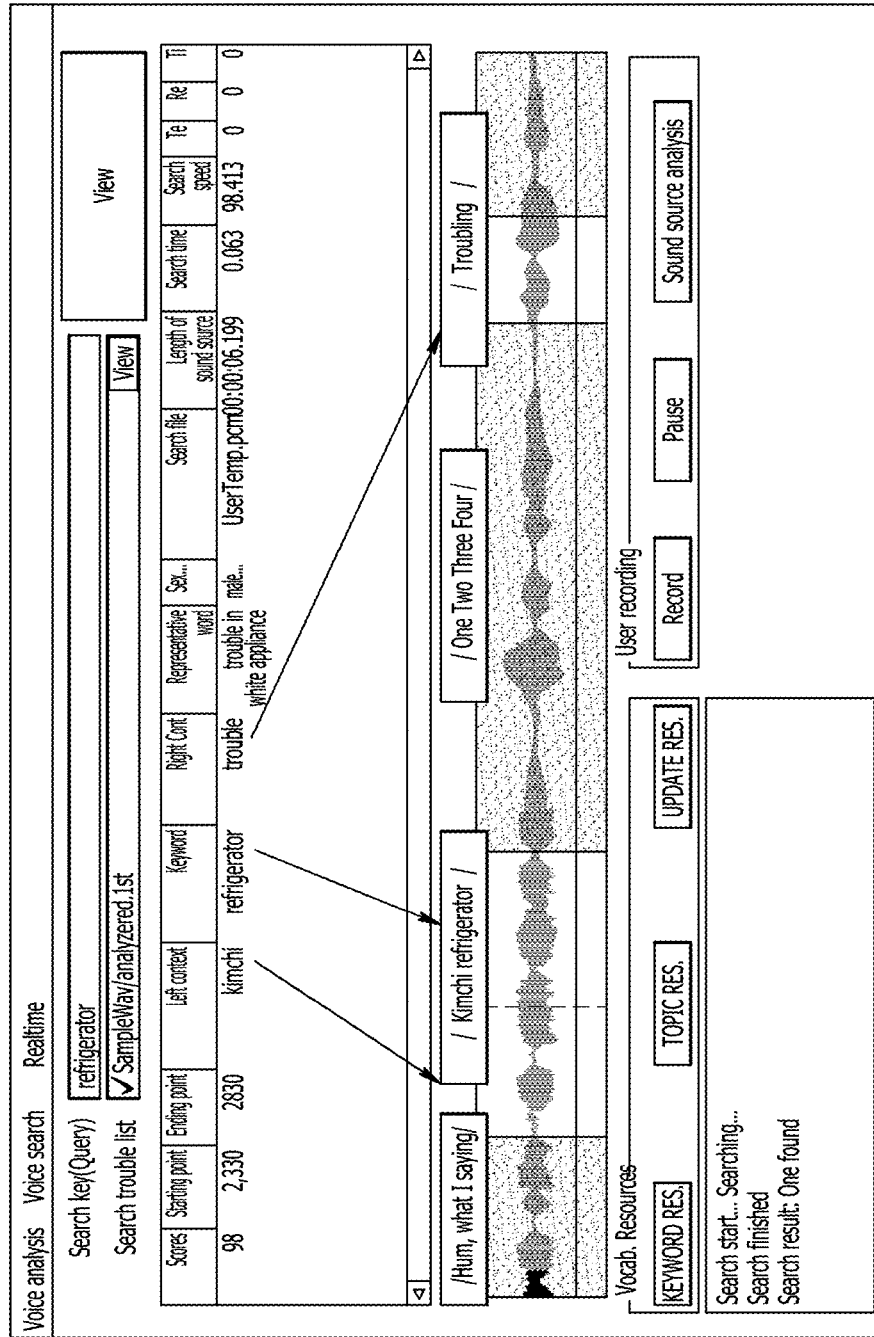
FIG. 11 shows an example of a screen displayed to a user by an output unit shown in FIG. 9.

The output unit 530 receives search result information and representative word information from the representative word grasper 520, and outputs a search screen to the user through the user interface 300. An example of the screen displayed to the user through the user interface 300 by the output unit 530 is shown in FIG. 11. It is known from FIG. 11 that the actual content spoken by the client is "Hum, what I saying, I called to ~ kimchi refrigerator ~ troubling", the search word provided by the user is "refrigerator", and the context keywords corresponding to the search word are "kimchi" and "trouble". Here, the client generates "troubling", and the appearance of the matching context keyword as "trouble" may be performed by setting a similar word according to a category scheme when setting a similar keyword to the search DB 410. For example, when the context keyword is "trouble", similar words such as "troubling", "troubled", or "has troubled" as well as "trouble" may be grouped into a category and may then be searched. In addition to this, a search of bynames is supported for the case of the search word, and when the user inputs "mobilephone" as the search word, the searcher 400 is configured to simultaneously search the bynames such as "mobilephone", "smartphone", "galaxyphone", or "iphone". Further, the search of bynames is allowable for verbs as well as nouns. For example, when the user inputs "agree with" as a search word, the searcher 400 is configured to simultaneously search the byname such as "having agreed with" as well as "agree with".

Also, it is known in FIG. 11 that standardized reliability value and times of a starting point and an ending point of the entire original sound source voice file are displayed as search results, and a grasped result that the representative word grasped by the search word "refrigerator" and the context keywords "kimchi" and "trouble" is "trouble in white appliance" is displayed together with it.

An indexing method with reference to a phoneme according to an exemplary embodiment of the present invention will now be described with reference to drawings.

Figure 12:
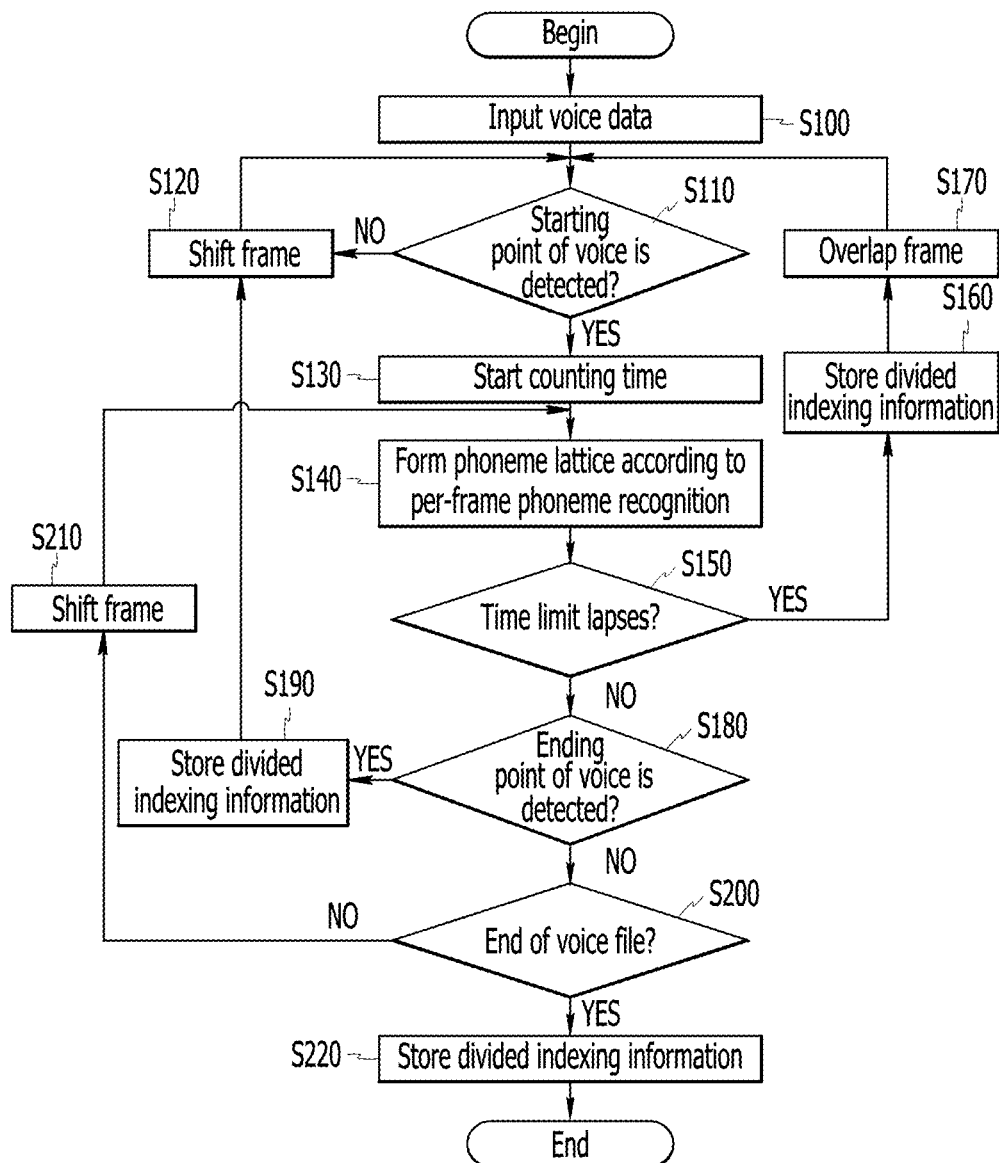
FIG. 12 shows a flowchart of an indexing method with reference to a phoneme according to an exemplary embodiment of the present invention.

FIG. 12 shows a flowchart of an indexing method with reference to phoneme according to an exemplary embodiment of the present invention.

Regarding the indexing method according to an exemplary embodiment of the present invention, when the voice of a client is recorded to generate a recorded voice file 11, the indexing method on the voice file 11 may be performed according to the user's immediate or later instructions.

Referring to FIG. 12, when a voice file 11 to be indexed is designated, voice data stored in the designated voice file 11 are input to the indexing unit 100 and are stored in the buffer unit 110 (S100).

The indexing controller 160 determines whether a starting point of voice is detected from the voice data stored in the buffer unit 110 (S110).

When the starting point of voice is not detected, the indexing controller 160 consecutively reads the voice data for each frame by shifting the frame (S120) in the voice data until the starting point of voice is detected.

When the starting point of voice is detected in the step S110, it signifies that a valid voice section begins for the first time in the voice data, so the indexing controller 160 starts counting the time (S130) and forms a phoneme lattice on the phonemes of the valid voice section according to per-frame phoneme recognition (S140). The step for forming a phoneme lattice according to per-frame phoneme recognition will be described in detail in a later portion of the specification.

Next, the indexing controller 160 determines whether a predetermined limited time, for example, ten seconds has lapsed (S150), and when the predetermined limited time has lapsed, it forcibly processes the time lapse as a finish of detection of the ending point of voice to store divided indexing information in the indexing DB 200 (S160). Here, the divided indexing information includes the phoneme lattice formed in the step S140 and a plurality of pieces of information. Such plurality of pieces of information have been described and no further detailed description will be provided. After this, frame overlapping is performed (S170) so as to preserve a loss of voice information caused by the forcible processing of the ending point of voice. For example, the voice section returns by about three seconds to perform the indexing process.

When it is determined in the step S150 that the limited time has not lapsed, the indexing controller 160 determines whether an ending point of voice is detected regarding the voice data so as to store divided indexing information (S180), and when the ending point of voice is detected, it stores the divided indexing information (S190) and repeats the process (S110) for finding a new starting point by frame-shifting the voice data (S120). When the ending point of voice is not detected in the step S180, it determines whether the voice file 11 reaches its end and no further voice data to be indexed are provided (S200), and when it is determined that the voice file 11 does not reach its end and further voice data to be indexed remain, it performs frame shifting so as to process the next frame (S210), and the step S130 for forming a phoneme lattice for the phonemes of the shifted frame is repeatedly performed.

As described, when it is determined in the step S200 that the voice file 11 reaches its end and there are no voice data to be indexed while the continuous voice data are indexed, the voice has begun but the limited time has not lapsed, and the ending point of voice is not detected and the voice file 11 has reached its end, the indexing controller 160 stores information that is indexed to the present time as divided indexing information (S220) so as to prevent loss of information, and finishes indexing the voice file 11.

Figure 13:
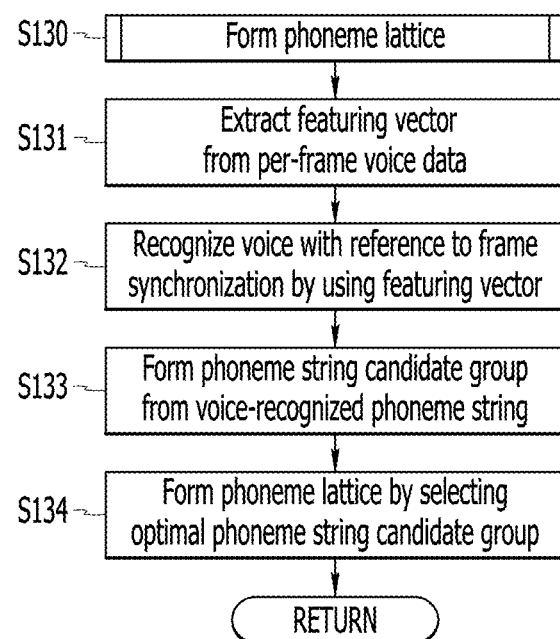
FIG. 13 shows a detailed flowchart of a stage for forming a phoneme lattice shown in FIG. 12.

FIG. 13 shows a detailed flowchart of a stage (S140) for forming a phoneme lattice shown in FIG. 12.

Referring to FIG. 13, the indexing controller 160 extracts a featuring vector from the per-frame voice data stored in and output by the buffer unit 110 (S131), and uses the extracted featuring vector to perform phoneme recognition with reference to frame synchronization (S132).

Continuously, the indexing controller 160 forms at least N-numbered phoneme string candidate groups from the phoneme string generated by phoneme recognition with respect to time of each frame (S133), and performs an operation in reverse order of time on the N-numbered formed phoneme string candidate groups to select one optimal phoneme string candidate group and form a corresponding phoneme lattice (S134).

Next, a method for grasping speech content on information indexed with reference to a phoneme based on the extraction of a keyword according to an exemplary embodiment of the present invention will be described with reference to drawings.

Figure 14:
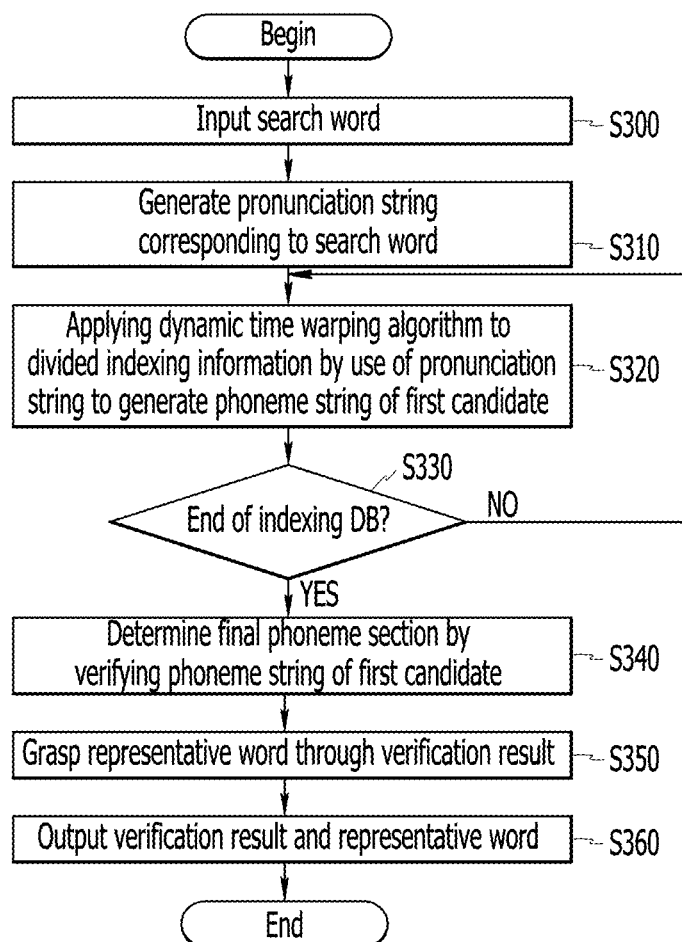
FIG. 14 shows a flowchart of a method for grasping speech content based on extraction of a keyword according to an exemplary embodiment of the present invention.

FIG. 14 shows a flowchart of a method for grasping speech content based on extraction of a keyword according to an exemplary embodiment of the present invention.

Regarding the method for grasping speech content based on extraction of a keyword according to an exemplary embodiment of the present invention, it will be assumed that when a voice file 11 for the user to grasp speech content is selected, the speech content is grasped for a file of the indexing DB 200 storing indexing information after the selected voice file 11 is indexed.

Referring to FIG. 14, when a keyword for a searching is input as a search word by the user through the user interface 300 (S300), the searcher 400 generates a per-phoneme pronunciation string for the input search word (S310).

After this, the searcher 400 uses the per-phoneme pronunciation string and searches a matching phoneme string for the divided indexing information stored in the indexing DB 200 by use of the dynamic time warping algorithm to output it as a phoneme string of the first candidate (S320).

The dynamic time warping processing of the step S320 is repeatedly performed to the end of the divided indexing information stored in the indexing DB 200 (S330).

After this, the searcher 400 performs a verifying process for determining one optimal voice section by precisely determining a matching state of the phoneme section of the first candidate selected by the dynamic time warping process according to an acoustic model, stores the determined voice section and various kinds of information relating to the voice section in the search DB 410, and simultaneously outputs the same to the grasper 500 (S340). In this instance, when the optimal candidate is determined, the searcher 400 performs an additional search to find whether there is a phoneme string matching the pronunciation string of the context keyword extracted from the search DB 410 corresponding to the search word within a predetermined time range with respect to the voice section corresponding to the optimal candidate.

Next, the grasper 500 extracts the search word and the context keyword according to a result verified by the searcher 400 to grasp the corresponding representative word through the representative word DB 510 (S350).

Finally, the grasper 500 displays and outputs the grasped representative word together with the search result searched by the search word to the user so that the user may grasp the speech content of the voice file 11 through the user interface 300 (S360).

Therefore, the user grasps the speech content of the voice file 11 through a result of searching the voice file 11 designated by the user through the keyword.

It has been described in the above that the searcher 400 performs a search based on one search word input by the user through the user interface 300, but the present invention is not limited thereto, and the searcher 400 may receive at least two search words, may respectively search the same, and may display respective search results to the user. Particularly, the logical operator may be used for a plurality of search words to grasp the representative word according to a combination of a plurality of search words in further detail and thereby grasp the speech content in further detail.

Further, the search result of the searcher 400 is stored as a search history in the search result history DB 450, such the search history is used as statistical materials to be available for a later advertisement or promotion, and the searched search word may not be repeatedly searched.

As described, according to an exemplary embodiment of the present invention, the keyword input as a search word is extracted from the voice data with reference to a phoneme, so there is no need to grasp the entire words of the voice data used in the actual service to provide a fast searching speed and high accuracy, the performance is better for the actual recorded data than the large-capacity continuous speech recognition method for performing a normal recognition process when the unregistered words are consecutively reflected, and the maintenance cost may be reduced.

Further, the speech contents of the voice file may be grasped according to a search result by a combination of a plurality of search words and a search result of representative words, so the time for grasping the speech content on the voice file is reduced and the response to the clients may be resultantly processed in a shorter time.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A system for grasping speech content, comprising:
an indexing unit, executed by a processor, for receiving voice data, performing per-frame voice recognition with reference to a phoneme to form a phoneme lattice, and generating divided indexing information for a frame of a limited time configured with a plurality of frames, the divided indexing information including a phoneme lattice formed for each frame of the limited time;
an indexing database, executed by a processor, for storing the divided indexing information generated by the indexing unit so as to be indexed by respective divided indexing information;
a searcher, executed by a processor, for using a keyword input by a user as a search word, performing a comparison on the divided indexing information stored in the indexing database with reference to a phoneme, and searching a phoneme string matching the search word; and
a grasper, executed by a processor, for grasping a representative word through a search result searched by the searcher and outputting it to the user so as to retrieve and display on a display device, speech content of the voice data corresponding to the keyword input together with the keyword input,
wherein the indexing unit includes:
a featuring vector extractor for extracting a featuring vector from per-frame voice data;
a phoneme recognizer for performing phoneme recognition with reference to frame synchronization by use of the featuring vector extracted by the featuring vector extractor, and generating a phoneme string;
a candidate group forming unit for receiving the phoneme string generated by the phoneme recognizer, and generating candidate groups of phoneme recognition with respect to time for each frame;
a phoneme lattice forming unit for performing an operation in reverse order of time on the phoneme string candidate groups formed by the candidate group forming unit to select one phoneme string candidate group and form a corresponding phoneme lattice; and
an indexing controller for controlling the featuring vector extractor, the phoneme recognizer, the candidate group forming unit, and the phoneme lattice forming unit to perform control so as to form a phoneme based lattice for each limited time for the entire voice data and for each frame within the limited time and to perform control so as to store the phoneme lattice formed in this manner in the indexing database as divided indexing information for each limited time and thereby allow the same to be indexed for each limited time.

2. The system of claim 1, wherein
the indexing controller includes:
a voice detector for indicating whether a voice is detected from voice data;
a time counter for counting a temporal position of a phoneme for performing phoneme recognition on the voice data;
a time limiter for counting the time starting from a time when a corresponding voice section is detected by the time counter when the voice section is detected by the voice detector, and counting the limited time; and
an operation controller for performing control for performing per-frame phoneme recognition on a valid voice section detected by the voice detector within a limited time counted by the time limiter, forming a phoneme lattice, and storing the same in the indexing database as divided indexing information.

3. The system of claim 2, wherein
the operation controller performs control so as to overlap a voice section of a specific time or a specific frame from among a previous voice section and perform phoneme recognition with a voice section corresponding to a new limited time starting from the corresponding frame when the limited time counted by the time limiter lapses regarding the valid voice section detected by the voice detector.

4. The system of claim 3, wherein
the searcher includes:
a search result history database for storing a search result searched by the searcher, and when there is a search result after having processed the search word input by the user, transmitting the same to the grasper;
a pronunciation string generator for generating a per-phoneme pronunciation string corresponding to the search word input by the user;
a search word database for storing the search word and a plurality of context keywords corresponding to the search word;
a dynamic time warping processor for searching a phoneme string matching divided indexing information stored in the indexing database by using a pronunciation string generated by the pronunciation string generator, and selecting a voice section of a first candidate; and
a verifier for determining a matching state on the voice section of the first candidate selected by the dynamic time warping processor through an acoustic model to determine one voice section, storing the determined voice section and information relating to the voice section in the search result history database, and simultaneously outputting the same to the grasper.

5. The system of claim 4, wherein
the dynamic time warping processor determines whether the phoneme string of the divided indexing information matches the pronunciation string through the dynamic time warping algorithm, and in the case of determination through the dynamic time warping algorithm, it determines that they match each other when their time warping degree is equal to or greater than a threshold value.

6. The system of claim 4, wherein
regarding the voice section that has become a candidate, the verifier allocates the voice section for each frame according to the phoneme string with state information of a phoneme model with reference to a tri-phone model for the phoneme string of the search word, finds an accumulated value of a ratio of an observation probability value on the tri-phone model and an observation probability value on a mono-phone model, normalizes the same to calculate a reliability value, and determines whether to output the same as a finally searched result for the voice section according to the normalized reliability value.

7. The system of claim 4, wherein
when the one voice section is determined, the verifier performs an additional search to find whether there is a phoneme string matching the pronunciation string of the context keyword extracted from the search database corresponding to the search word within a predetermined time range with respect to the one voice section.

8. The system of claim 4, wherein
information relating to the voice section stored in the search result history database includes a file name including the one voice section, a starting position and an ending position of voice data, the search word, a normalized reliability value on a searched section, a matching context keyword, and a sex of a speaker.

9. The system of claim 4, wherein
the grasper includes:
a representative word database for setting a representative word for each search word and context keyword corresponding to the search word;
a representative word grasper for extracting a search word and a context keyword from among search result information output by the searcher, and searching a corresponding representative word through the representative word database; and
an output unit for receiving the search result information and the representative word from the representative word grasper and displaying the same to the user.

10. The system of claim 4, wherein
the context keyword sets a plurality of words carrying a same meaning according to a category method.

11. The system of claim 4, wherein
the searcher generates a pronunciation string for a byname with the same meaning as the search word and simultaneously searches the same.

12. The system of claim 1, wherein
the phoneme recognizer performs a Viterbi algorithm and a token passing algorithm for each phoneme to generate a corresponding phoneme string.

13. The system of claim 1, wherein
the phoneme lattice forming unit forms information including a starting point and an ending point of a phoneme and a duration of the corresponding phoneme string.

14. The system of claim 1, wherein
the divided indexing information includes a number of frames, a number of phonemes, a featuring vector, observation probability values for respective states of phonemes, a time stamp, a phoneme string, and durations of respective phonemes.

15. In a method for a speech content grasping system to grasp speech content of voice data, a method for grasping speech content comprising:
receiving a search word from a user;
generating a pronunciation string with reference to a phoneme corresponding to the search word;
searching a phoneme string matching divided indexing information stored in an indexing database by use of the pronunciation string, and selecting a voice section of a first candidate, the indexing database storing the phoneme lattice formed by performing voice recognition on the voice data for each frame with reference to a phoneme as divided indexing information for a plurality of respective frames of a limited time;
determining a matching state of the voice section of the first candidate through an acoustic model to determine one voice section;
additionally searching whether there is a phoneme string matching a pronunciation string of a context keyword corresponding to the search word within a predetermined time range with reference to the one voice section; and
grasping a representative word for the voice data through the search word and the context keyword, by retrieving and displaying on a display device, speech content of the voice data corresponding to the keyword input, together with the keyword input to the user;
wherein the phoneme lattice formed by performing voice recognition on the voice date for each frame with reference to a phoneme includes the steps of:
extracting a featuring vector from per-frame voice data;
performing phoneme recognition with reference to frame synchronization by use of the featuring vector extracted and generating a phoneme string;
receiving the phoneme string generated and generating candidate groups of phoneme recognition with respect to time for each frame; and
performing an operation in reverse order of time on the phoneme string candidate groups generated to select one phoneme string candidate group and form a corresponding phoneme lattice;
performing control so as to form a phoneme based lattice for each limited time for the entire voice data and for each frame within the limited time and to perform control so as to store the phoneme lattice formed in this manner in the indexing database as divided indexing information for each limited time and thereby allow the same to be indexed for each limited time.

16. The method of claim 15, wherein
in the grasping of a representative word and providing the same to the user, the grasping of a representative word is performed through a representative word database in which representative words are set for respective search words and corresponding context keywords.

17. The method of claim 15, wherein
the search words are plural, a plurality of search words are used by a logical operator, and a search is performed by a combination of the plurality of search words.

* * * * *